US011092106B2

(12) United States Patent
Polonowski

(10) Patent No.: US 11,092,106 B2
(45) Date of Patent: Aug. 17, 2021

(54) SYSTEM AND METHOD FOR PROCESSING CYLINDER PRESSURES

(71) Applicant: Ford Global Technologies, LLC, Dearborn, MI (US)

(72) Inventor: Christopher Polonowski, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 132 days.

(21) Appl. No.: 16/365,001

(22) Filed: Mar. 26, 2019

(65) Prior Publication Data

US 2020/0309057 A1 Oct. 1, 2020

(51) Int. Cl.

| *F02D 41/26* | (2006.01) |
|---|---|
| *F02B 37/24* | (2006.01) |
| *F02B 37/18* | (2006.01) |
| *F02D 41/00* | (2006.01) |
| *F02D 41/30* | (2006.01) |

(52) U.S. Cl.
CPC ............ *F02D 41/263* (2013.01); *F02B 37/18* (2013.01); *F02B 37/24* (2013.01); *F02D 41/0007* (2013.01); *F02D 41/0052* (2013.01); *F02D 41/3005* (2013.01); *F02D 2200/024* (2013.01)

(58) Field of Classification Search
CPC ............... F02D 41/263; F02D 41/0007; F02D 41/0052; F02D 41/3005; F02D 2200/024; F02B 37/18; F02B 37/24
USPC ......................................................... 701/103
See application file for complete search history.

(56) References Cited

U.S. PATENT DOCUMENTS

| 7,159,551 | B2 | 1/2007 | Cecur et al. | |
|---|---|---|---|---|
| 7,404,383 | B2 | 7/2008 | Elendt | |
| 9,605,603 | B2 | 3/2017 | Glugla et al. | |
| 9,624,863 | B1* | 4/2017 | Ge | F02D 33/003 |
| 2008/0082250 | A1* | 4/2008 | Husted | F02D 41/266 701/115 |
| 2008/0228374 | A1* | 9/2008 | Ishizuka | F02D 41/3836 701/103 |
| 2009/0205617 | A1* | 8/2009 | Tonetti | F02D 41/0062 123/568.18 |
| 2009/0326788 | A1* | 12/2009 | Yuasa | F02D 41/3809 701/104 |
| 2010/0286891 | A1* | 11/2010 | Huang | G01M 15/11 701/102 |
| 2010/0312456 | A1* | 12/2010 | Nishimura | F02D 35/023 701/103 |
| 2013/0338906 | A1* | 12/2013 | Akazaki | F02D 35/023 701/105 |
| 2014/0202427 | A1* | 7/2014 | Shutty | F02D 41/0002 123/350 |
| 2014/0219577 | A1* | 8/2014 | Hayashi | G06F 7/766 382/260 |
| 2020/0208578 | A1* | 7/2020 | Frank | F02D 35/024 |

* cited by examiner

*Primary Examiner* — David Hamaoui
*Assistant Examiner* — John D Bailey
(74) *Attorney, Agent, or Firm* — Geoffrey Brumbaugh; McCoy Russell LLP

(57) ABSTRACT

Methods and systems for operating an engine responsive to filtered cylinder pressure data are disclosed. In one example, fuel injection timing may be advanced in response to filtered cylinder pressure data that is indicative of onset of combustion in a cylinder being delayed from an expected timing. The filtered cylinder pressure data may be generated via a digital filter.

20 Claims, 10 Drawing Sheets

SYSTEM AND METHOD FOR PROCESSING CYLINDER PRESSURES

BACKGROUND/SUMMARY

An engine may include a plurality of cylinders to combust fuel and deliver propulsive power to a vehicle. A control system of the engine may attempt to operate the cylinders in a like manner, but there may be differences in the way combustion occurs in each of the cylinders due to variation in cylinder air charge, cylinder fueling, fuel injection timing, and cylinder temperatures. One way to reduce combustion differences between cylinders or to determine if combustion in a cylinder is progressing as desired is to instrument one or more engine cylinders with pressure sensors. Useful control parameters and combustion parameters may be determined from cylinder pressures. However, the cylinder pressure sensor output may also include pressure artifacts that may be related to the natural response of the cylinders in which the pressure sensors reside. These pressure artifacts may introduce errors into combustion parameters and control parameters that may be determined from cylinder pressure sensor output. One way to remove some unwanted resonant frequencies that may develop in cylinder pressure may be to filter cylinder pressure data via an analog or digital low pass or bandpass filter. However, these filters may introduce phase delays and they may also adversely alter the combustion process pressure while removing a cylinder's natural resonant frequencies. Consequently, these filters may introduce errors into control and combustion parameters that are determined from cylinder pressure. For example, timing or start of combustion may be delayed, location and amplitude of peak cylinder pressure may be altered, and crankshaft angles where particular levels of cylinder charge mass is combusted may be altered due to filtering techniques. Therefore, it may be desirable to provide a way of filtering cylinder pressure data that preserves combustion pressure changes while removing resonance pressure changes that may be due to cylinder geometry.

The inventor herein has recognized the above-mentioned disadvantages of conventional filters and has developed an engine operating method, comprising: storing values of a sampled cylinder pressure in a data array in memory of a controller; generating a first signal envelope data array and a second signal envelope data array from the values of the sampled cylinder pressure in the data array, values in the first signal envelope data array and values in the second signal envelope data array bounding the values in the data array; generating values in a filtered cylinder pressure data array that are less than or equal to values in the first signal envelope data array and values that are equal to or greater than values in the second signal envelope data array; and adjusting an engine actuator via the controller responsive to the values in the filtered cylinder pressure data array.

By digitally filtering cylinder pressure via a filter that includes an upper and a lower envelope, it may be possible to provide the technical result of improving determination of engine control parameters and combustion parameters so that combustion in engine cylinders may be improved and/or optimized. In particular, a left-sided envelope acoustic filter (LEAF) algorithm may be applied to sampled cylinder pressure data to remove acoustic resonant frequencies from the sampled cylinder pressure data that may be related to cylinder geometry and that are not combustion pressure changes. By removing the acoustic frequencies from sampled cylinder pressure data, it may be possible to produce a filtered cylinder pressure signal that may be more indicative of combustion in the engine cylinder and less indicative of the engine's geometric properties. The left-sided envelope acoustic filter exhibits zero phase shift so that combustion event timing may be evaluated without compensating for phase delays that may accompany many analog filters.

The present description may provide several advantages. In particular, the approach may improve pressure control for engine cylinders. In addition, the approach may improve detection of combustion related artifacts in cylinder pressure data. Further, the approach is left sided so that cylinder pressure changes due to combustion may be detected before resonant frequencies may be generated within the cylinder, thereby improving the process of distinguishing signal from acoustic noise in the cylinder pressure data.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
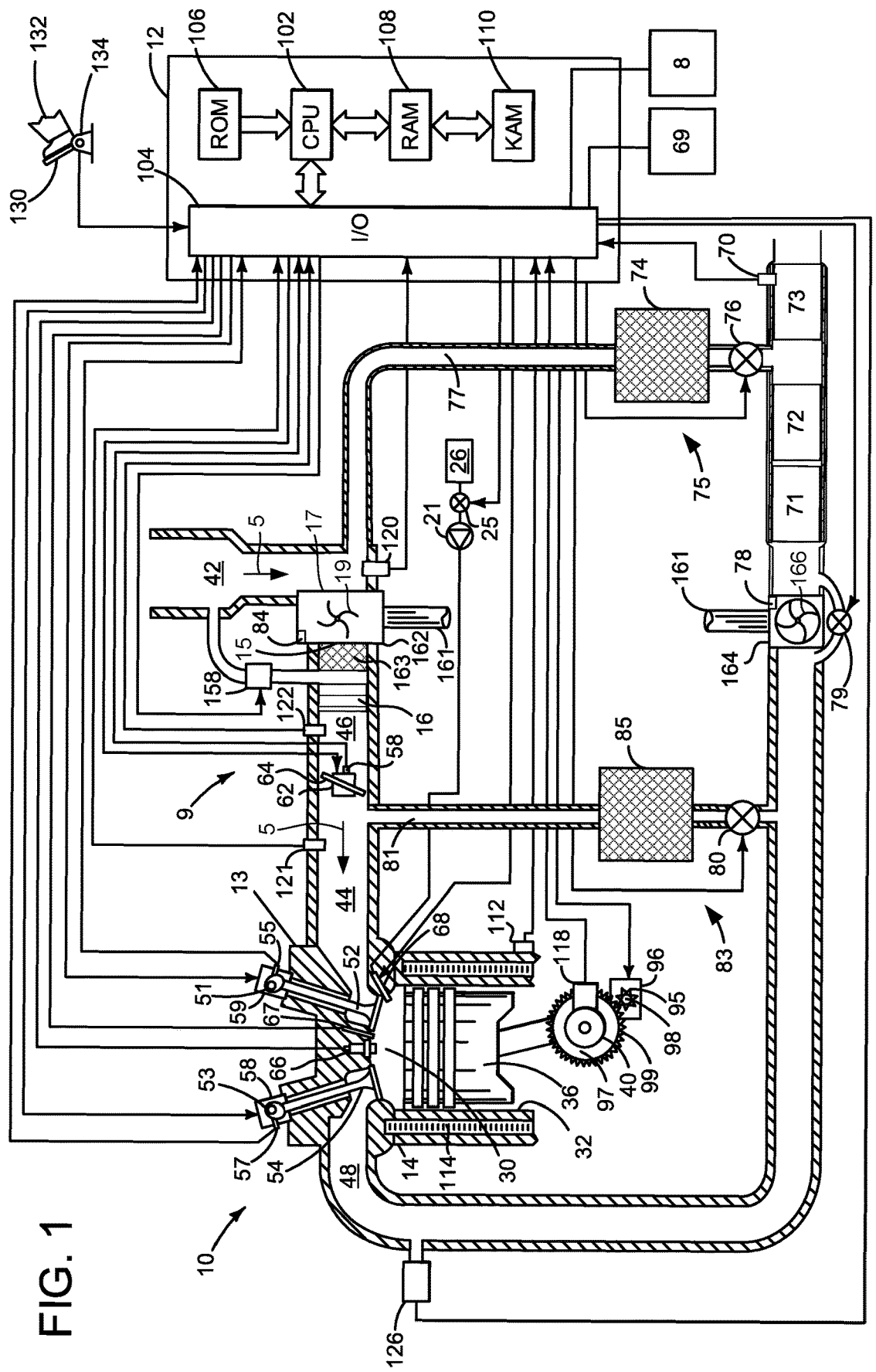
FIG. 1 shows a detailed schematic depiction of an example engine.

The present description is related to operating an engine that includes a cylinder pressure sensor. FIG. 1 shows one example of a boosted diesel engine that includes a cylinder pressure sensor. The engine may include a plurality of cylinders each having a cylinder pressure sensor for determining cylinder pressure in each of the cylinders. Pressure in engine cylinders may include attributes as shown in FIGS. 2-5C. The cylinder pressures may be filtered via a left-sided envelope acoustic filter that operates as shown in FIGS. 6-9. The engine may be operated and the cylinder pressure may be filtered via the method shown in FIGS. 10-13.

Referring to FIG. 1, internal combustion engine 10, comprising a plurality of cylinders, one cylinder of which is shown in FIG. 1, is controlled by electronic engine controller 12. The controller 12 receives signals from the various sensors of FIG. 1. Controller 12 employs the various actuators of FIG. 1 to adjust engine operation based on the received signals and instructions stored on a memory of the controller.

Engine 10 includes combustion chamber 30 and cylinder walls 32 with piston 36 positioned therein and connected to crankshaft 40. Cylinder head 13 is fastened to engine block 14. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. Although in other examples, the engine may operate valves via a single camshaft or pushrods. The position of intake cam 51 may be determined by intake cam sensor 55. The position of exhaust cam 53 may be determined by exhaust cam sensor 57. Intake poppet valve 52 may be operated by a variable valve activating/deactivating actuator 59, which may be a cam driven valve operator (e.g., as shown in U.S. Pat. Nos. 9,605,603; 7,404,383; and 7,159,551 all of which are hereby fully incorporated by reference for all purposes). A rocker stop device 58 may be included with exhaust poppet valve 54 to hold the exhaust valve open over an entire cycle of the engine. The rocker stop device 58 may be referred to as a de-compression valve actuator. The combination of exhaust valve 54 and rocker stop device 58 may be referred to as a de-compression valve. Flow of fuel supplied to cylinder 30 may also cease when rocker stop device 58 holds exhaust valve 54 open.

Fuel injector 68 is shown positioned in cylinder head 13 to inject fuel directly into combustion chamber 30, which is known to those skilled in the art as direct injection. Fuel is delivered to fuel injector 68 by a fuel system including a fuel tank 26, fuel pump 21, fuel pump control valve 25, and fuel rail (not shown). Fuel pressure delivered by the fuel system may be adjusted by varying a position valve regulating flow to a fuel pump (not shown). In addition, a metering valve may be located in or near the fuel rail for closed loop fuel control. A pump metering valve may also regulate fuel flow to the fuel pump, thereby reducing fuel pumped to a high pressure fuel pump.

Engine air intake system 9 includes intake manifold 44, throttle 62, grid heater 16, charge air cooler 163, turbocharger compressor 162, and intake plenum 42. Intake manifold 44 is shown communicating with optional electronic throttle 62 which adjusts a position of throttle plate 64 to control air flow from intake boost chamber 46. Compressor 162 draws air from air intake plenum 42 to supply boost chamber 46. Compressor vane actuator 84 adjusts a position of compressor vanes 19. Exhaust gases spin turbine 164 which is coupled to turbocharger compressor 162 via shaft 161. In some examples, a charge air cooler 163 may be provided. Further, an optional grid heater 16 may be provided to warm air entering cylinder 30 when engine 10 is being cold started. Compressor speed may be adjusted via adjusting a position of turbine variable vane control actuator 78 or compressor recirculation valve 158. In alternative examples, a waste gate 79 may replace or be used in addition to turbine variable vane control actuator 78. Turbine variable vane control actuator 78 adjusts a position of variable geometry turbine vanes 166. Exhaust gases can pass through turbine 164 supplying little energy to rotate turbine 164 when vanes are in an open position. Exhaust gases can pass through turbine 164 and impart increased force on turbine 164 when vanes are in a closed position. Alternatively, wastegate 79 or a bypass valve may allow exhaust gases to flow around turbine 164 so as to reduce the amount of energy supplied to the turbine. Compressor recirculation valve 158 allows compressed air at the outlet 15 of compressor 162 to be returned to the inlet 17 of compressor 162. Alternatively, a position of compressor variable vane actuator 78 may be adjusted to change the efficiency of compressor 162. In this way, the efficiency of compressor 162 may be reduced so as to affect the flow of compressor 162 and reduce the possibility of compressor surge. Further, by returning air back to the inlet of compressor 162, work performed on the air may be increased, thereby increasing the temperature of the air. Optional electric machine 165 is also shown coupled to shaft 161. Air flows into engine 10 in the direction of arrows 5.

Flywheel 97 and ring gear 99 are coupled to crankshaft 40. Starter 96 (e.g., low voltage (operated with less than 30 volts) electric machine) includes pinion shaft 98 and pinion gear 95. Pinion shaft 98 may selectively advance pinion gear 95 to engage ring gear 99 such that starter 96 may rotate crankshaft 40 during engine cranking. Starter 96 may be directly mounted to the front of the engine or the rear of the engine. In some examples, starter 96 may selectively supply torque to crankshaft 40 via a belt or chain. In one example, starter 96 is in a base state when not engaged to the engine crankshaft. An engine start may be requested via human/machine interface (e.g., key switch, pushbutton, remote radio frequency emitting device, etc.) 69 or in response to vehicle operating conditions (e.g., brake pedal position, accelerator pedal position, battery SOC, etc.). Battery 8 may supply electrical power to starter 96. Controller 12 may monitor battery state of charge.

Combustion is initiated in the combustion chamber 30 when fuel automatically ignites via combustion chamber temperatures reaching the auto-ignition temperature of the fuel that is injected to cylinder 30. The temperature in the cylinder increases as piston 36 approaches top-dead-center compression stroke. In some examples, a universal Exhaust Gas Oxygen (UEGO) sensor 126 may be coupled to exhaust manifold 48 upstream of emissions device 71. In other examples, the UEGO sensor may be located downstream of one or more exhaust after treatment devices. Further, in some examples, the UEGO sensor may be replaced by a NOx sensor that has both NOx and oxygen sensing elements.

At lower engine temperatures optional glow plug 66 may convert electrical energy into thermal energy so as to create a hot spot next to one of the fuel spray cones of an injector in the combustion chamber 30. By creating the hot spot in the combustion chamber next to the fuel spray 30, it may be easier to ignite the fuel spray plume in the cylinder, releasing heat that propagates throughout the cylinder, raising the temperature in the combustion chamber, and improving combustion. Cylinder pressure may be measured via cylinder pressure sensor 67, alternatively or in addition, sensor 67 may also sense cylinder temperature.

Emissions device 71 can include an oxidation catalyst and it may be followed by a diesel particulate filter (DPF) 72 and a selective catalytic reduction (SCR) catalyst 73, in one example. In another example, DPF 72 may be positioned downstream of SCR 73. Temperature sensor 70 provides an indication of SCR temperature.

Exhaust gas recirculation (EGR) may be provided to the engine via high pressure EGR system 83. High pressure EGR system 83 includes valve 80, EGR passage 81, and EGR cooler 85. EGR valve 80 is a valve that closes or allows exhaust gas to flow from upstream of emissions device 71 to a location in the engine air intake system downstream of compressor 162. EGR may be cooled via passing through EGR cooler 85. EGR may also be provided via low pressure EGR system 75. Low pressure EGR system 75 includes EGR passage 77 and EGR valve 76. Low pressure EGR may flow from downstream of emissions device 71 to a location upstream of compressor 162. Low pressure EGR system 75 may include an EGR cooler 74.

Controller 12 is shown in FIG. 1 as a conventional microcomputer including: microprocessor unit 102, input/output ports 104, read-only memory (e.g., non-transitory memory) 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing accelerator position adjusted by human foot 132; a measurement of engine manifold pressure (MAP) from pressure sensor 121 coupled to intake manifold 44 (alternatively or in addition sensor 121 may sense intake manifold temperature); boost pressure from pressure sensor 122 exhaust gas oxygen concentration from oxygen sensor 126; an engine position sensor from a Hall effect sensor 118 sensing crankshaft 40 position; a measurement of air mass entering the engine from sensor 120 (e.g., a hot wire air flow meter); and a measurement of throttle position from sensor 58. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In some examples, fuel may be injected to a cylinder a plurality of times during a single cylinder cycle.

In a process hereinafter referred to as ignition, the injected fuel is ignited by compression ignition resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is described merely as an example, and that intake and exhaust valve opening and/or closing timings may vary, such as to provide positive or negative valve overlap, late intake valve closing, or various other examples. Further, in some examples a two-stroke cycle may be used rather than a four-stroke cycle.

Thus, the system of FIG. 1 provides for an engine system, comprising: an internal combustion engine including a cylinder with a pressure sensor; and a controller including executable instructions stored in non-transitory memory to generate values in a filtered cylinder pressure data array based on stored cylinder pressure values, the filtered cylinder pressure data array including values that are an average of values in a first signal envelope data array and values in in a second signal envelope data array, and to adjust an engine actuator responsive to the values in the filtered cylinder pressure data array. The engine system further comprises a fuel injector, and additional executable instructions stored in non-transitory memory to adjust fuel injector timing in response to values in the filtered cylinder pressure data. The engine system further comprises additional executable instructions stored in non-transitory memory to generate the first signal envelope data array. The engine system of claim further comprises additional executable instructions stored in non-transitory memory to generate the second signal envelope data array. The engine system further comprises additional executable instructions stored in non-transitory memory to generate the values in the filtered cylinder pressure data array from values in the first signal envelope data array and values in the second signal envelope data array.

Figure 2:
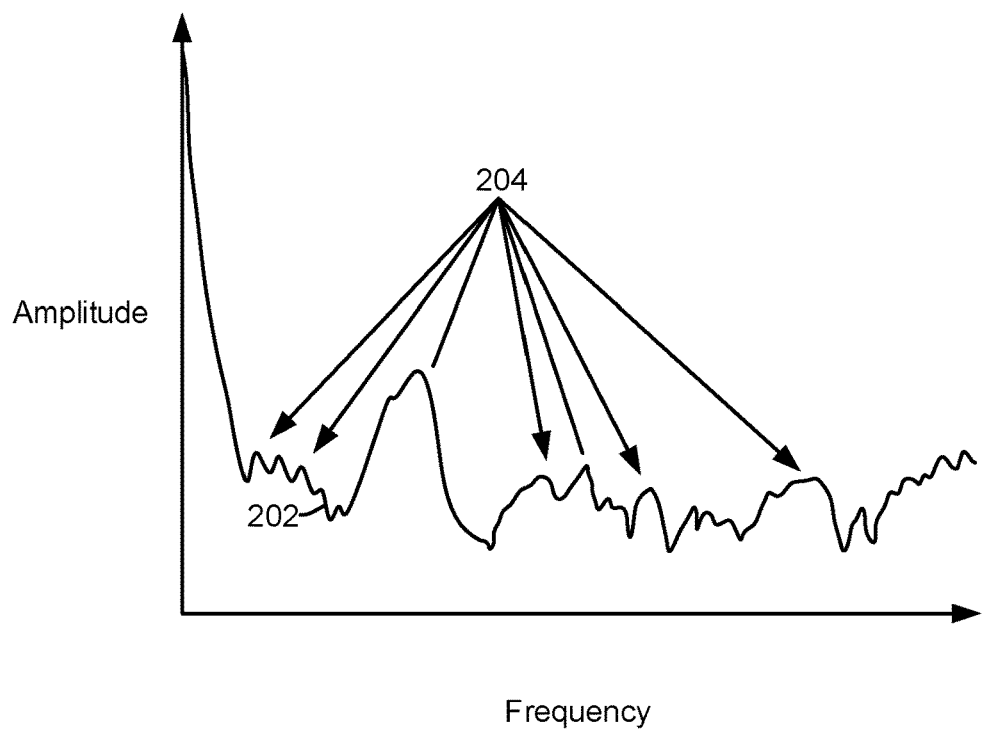
FIGS. 2-5C show example cylinder pressure traces and frequencies.

Referring now to FIG. 2, a plot of example of combustion chamber resonant frequencies is shown. The vertical axis represents the signal amplitude in units of pressure that increase in the direction of the vertical axis arrow. The horizontal axis represents frequencies in sampled cylinder pressure data and the frequencies increase in the direction of the horizontal axis arrow. In this example, the resonance frequencies are indicated by the peak values at the various frequencies in trace 202. The peak frequencies occur as indicated at 204.

Combustion in an engine cylinder releases chemical energy, which results in a rapid rise or increase in cylinder pressure. Pressure from combustion may include frequency content that may overlap with resonant natural frequencies and resonant modes of the cylinder and the combustion chamber. The resonant natural frequencies may be excited via the increase in cylinder pressure. In particular, the rising cylinder pressure due to combustion may excite the resonant modes of the combustion chamber, which manifest in the measured cylinder pressure signal as acoustic or oscillatory waves that oscillate about the mean combustion chamber cylinder pressure that is generated by combustion and that is void of resonant modes or frequencies. It may be desirable to filter out resonant frequencies so that determination of combustion parameters and control parameters may be improved.

Figure 3:
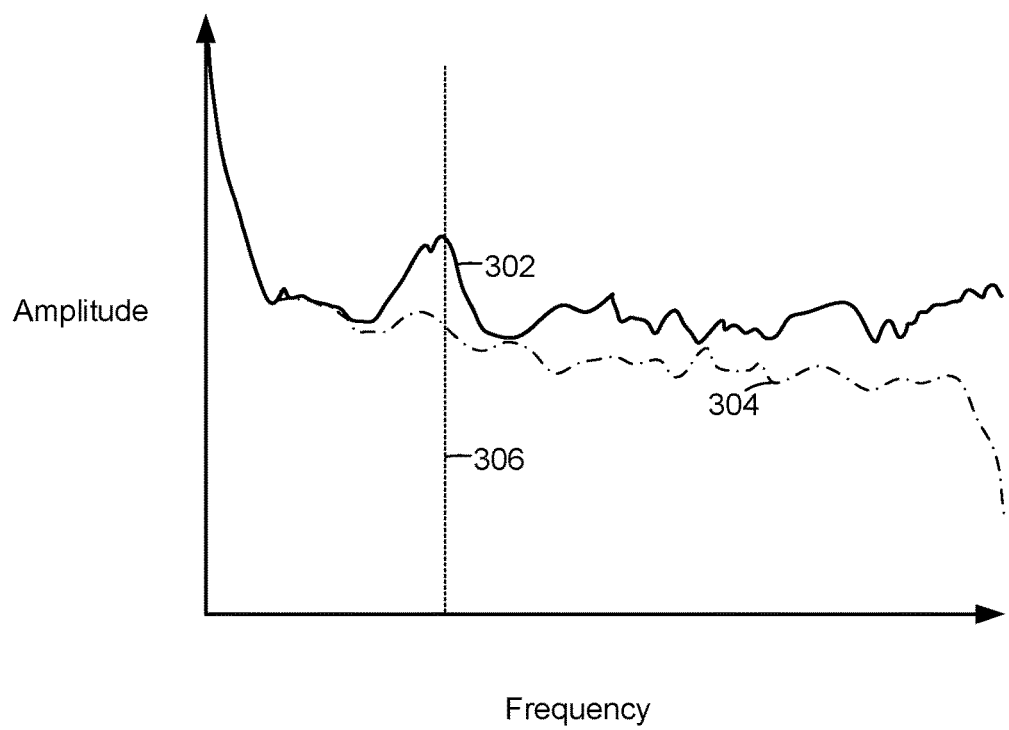

Referring now to FIG. 3, a plot showing frequency response of raw or unfiltered cylinder pressure 302 and frequency response of output of a left-sided envelope acoustic filter (LEAF) 304 that operates on, or filters, the raw cylinder pressure is shown. The vertical axis represents signal amplitude and the signal amplitude increases in the direction of the vertical axis arrow. The horizontal axis represents signal frequency and signal frequency increases from the left side of the plot to the right side of the plot. It may be observed that the LEAF attenuates the frequencies having peak amplitudes while retaining much of the signal strength at frequencies where the amplitude is rather flat. For example, the LEAF output frequency response 304 indicates that resonant frequencies at frequency 306 are significantly attenuated. Conversely, typical low pass analog filters and bandpass filters (not shown) often attenuate all frequencies above their cut-off frequencies and/or they are ineffective to attenuate acoustic resonant frequencies that are in the filter's pass band. Consequently, values of combustion parameters (e.g., start of combustion time or crankshaft angle, location of peak cylinder pressure, location of 50% mass fraction burn, and other combustion parameters) determined from the filtered cylinder pressures may not be as accurate as is desired. However, the LEAF generates zero phase in its output and it may attenuate resonant frequencies that may fall within a window of combustion pressure frequencies.

Figure 4A:
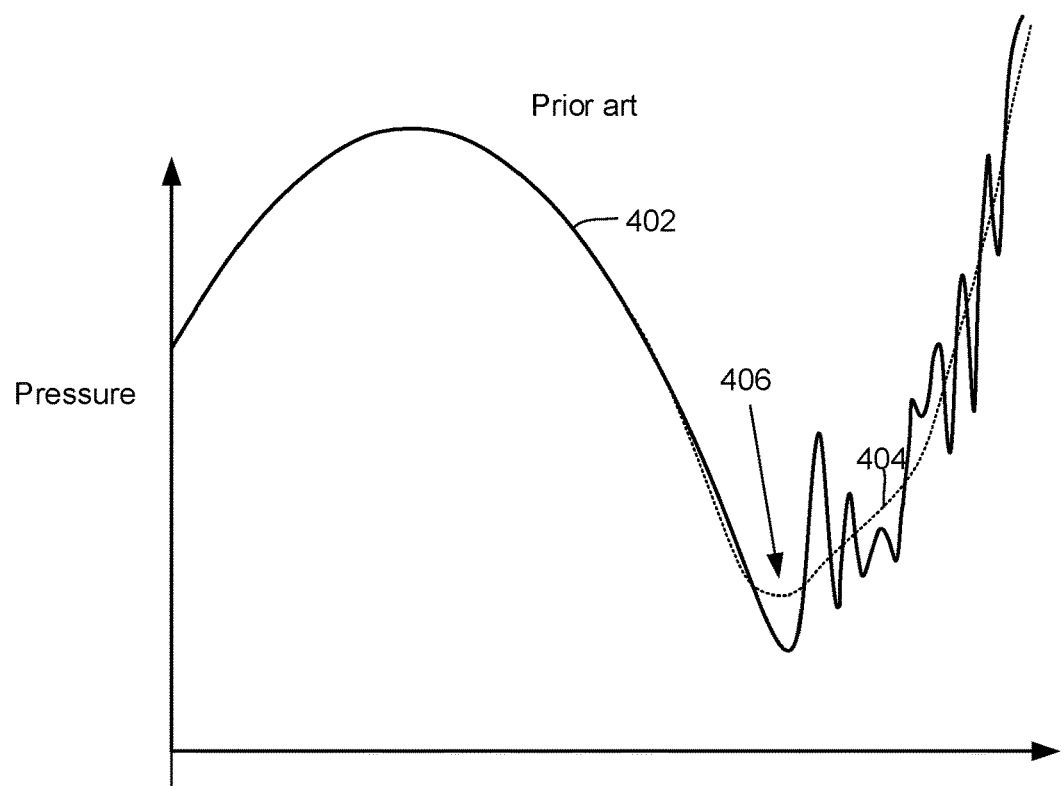

Referring now to FIG. 4A, a plot that shows a raw or unfiltered cylinder pressure signal and output of a low pass filter that is applied to the raw cylinder pressure signal is shown. The vertical axis represents cylinder pressure and cylinder pressure increases in the direction of the vertical axis. The horizontal axis represents engine position and engine position advances from the left side of the figure to the right side of the figure. The raw cylinder pressure is indicated by solid trace 402 and the low pass filtered cylinder pressure is indicated by pressure dashed trace 404. The low pass filtered cylinder pressure is equal to the raw cylinder pressure when only trace 404 is visible. The low pass filtered cylinder pressure trace 404 is output from a 3 kilohertz analog low pass filter that is filtering the raw cylinder pressure signal 402.

The raw cylinder pressure 402 and the low pass filtered cylinder pressure 404 are equal and rising at the left side of the figure, then they begin to decrease and compression ignition occurs at the engine position that is coincident with 406. After the raw cylinder pressure begins to rise after ignition at 406, high frequency pressure oscillations begin in the raw cylinder pressure as the raw cylinder pressure continues to rise and the engine position increases in the direction to the right. The low pass filtered cylinder pressure does not fall to as low as a pressure as the raw cylinder pressure and the low pass filtered cylinder pressure does not contain the pressure oscillations that may be due to resonant cylinder frequencies. Thus, the low pass filtered data lacks the fidelity of the raw cylinder pressure data, which may cause errors in determining some engine control parameters and combustion parameters that are determined from cylinder pressure. As such, low pass filtering the raw cylinder pressure may attenuate unwanted cylinder resonance frequencies, but it may also distort or introduce errors into the determination of engine control parameters and combustion parameters. Therefore, the low pass filter may not deliver desired results.

Figure 4B:
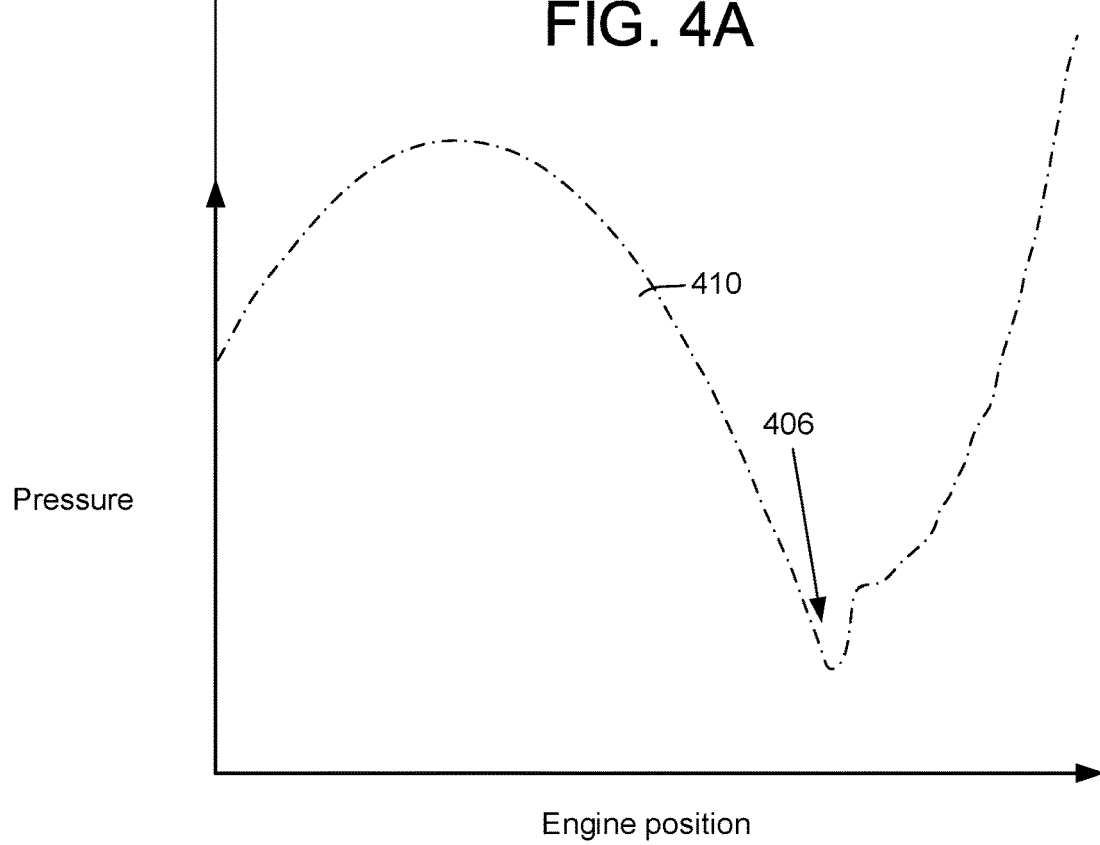

Referring now to FIG. 4B, a plot that shows a output of LEAF that has applied to the raw cylinder pressure signal shown in FIG. 4A is shown. The vertical axis represents cylinder pressure and cylinder pressure increases in the direction of the vertical axis. The horizontal axis represents engine position and engine position advances from the left side of the figure to the right side of the figure. Trace 410 represents output of the LEAF applied to the raw cylinder pressure 402 shown in FIG. 4A.

Cylinder pressure output from the LEAF 410 follows the same trajectory as the raw cylinder pressure at the left side of the plot, and then they begin to decrease and compression ignition occurs at the engine position that is coincident with 406. The cylinder pressure that is output from the LEAF follows the raw pressure immediately before and immediately following the location of ignition 406. The cylinder pressure that is output from the LEAF after ignition at 406 follows an average value of the raw cylinder pressure while the raw cylinder pressure trace is oscillation as shown in FIG. 4A. Thus, the cylinder pressure output from the LEAF provides higher signal fidelity during the ignition event so that more precise timing of ignition may be determined from the cylinder pressure that is output from the LEAF as compared to cylinder pressure output from the low pass filter. In addition, the LEAF attenuates the cylinder resonance frequencies so that cylinder resonance frequencies may have less effect on determination of control parameters and cylinder pressure parameters.

Figure 5A:
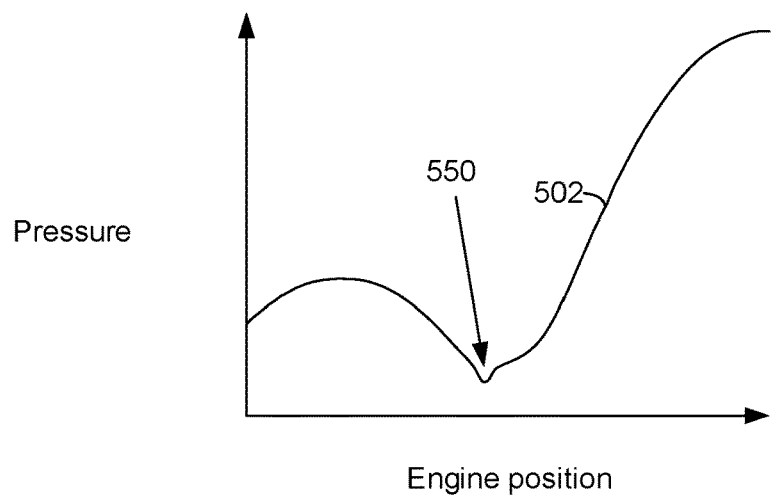
Figure 5B:
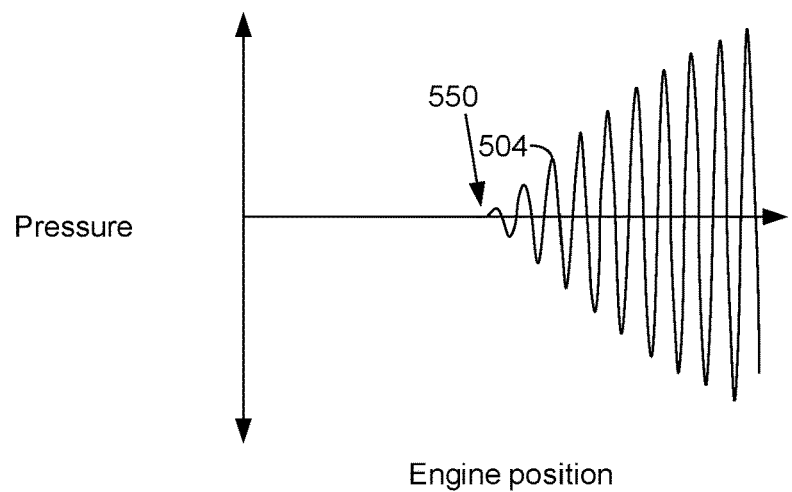
Figure 5C:
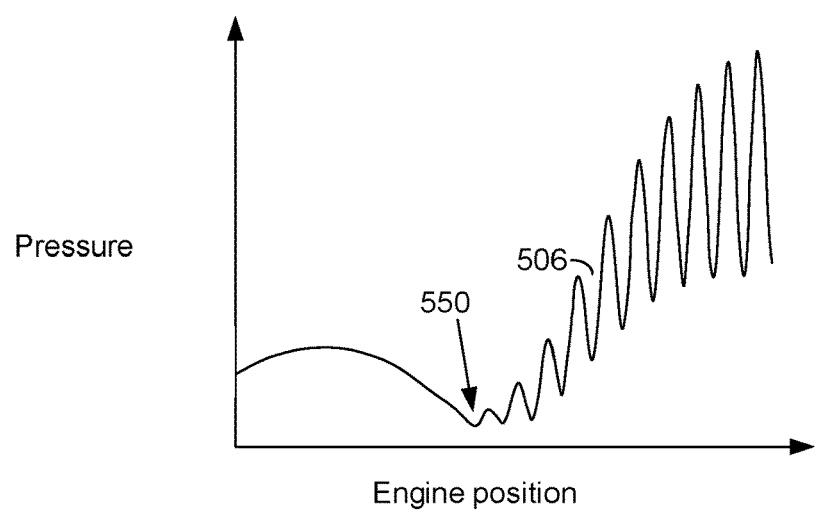

Referring now to FIGS. 5A-5C, these figures show a cylinder pressure trace that does not include cylinder resonance frequencies (FIG. 5A), cylinder resonance frequencies that are excited by rising cylinder pressure (FIG. 5B), and a cylinder pressure trace that includes cylinder resonance frequencies (FIG. 5C). The plots are aligned vertically in engine position.

The vertical axis of FIG. 5A represents cylinder pressure versus engine position, and cylinder pressure increases in the direction of the vertical axis arrow. The horizontal axis represents engine position and the engine position advances from the left side of the figure to the right side of the figure. The cylinder pressure 502 in FIG. 5A represents pressure in the cylinder absence any resonant cylinder frequency modes. The cylinder pressure shown in FIG. 5A is cylinder pressure due to piston motion and combustion. It may be desirable to generate such a cylinder pressure when determining or evaluating engine control parameters and cylinder combustion parameters. However, cylinder pressure sensor may also be exposed to resonant cylinder pressures that are due to the natural frequency of the cylinder.

The cylinder pressure in FIG. 5A begins by increasing on the left side of FIG. 5A where the cylinder's piston is approaching top-dead-center compression stroke. Ignition of the air-fuel mixture in the cylinder occurs at 550. The cylinder pressure increases after ignition at 550 as chemical energy is release in the form of heat from the air-fuel mixture.

FIG. 5B shows generation of a cylinder resonant frequency of about 7 kilohertz. The vertical axis of FIG. 5B represents cylinder pressure versus engine position, and cylinder pressure above the horizontal axis is positive and cylinder pressure below the horizontal axis is negative. The magnitude of positive portions of the cylinder pressure signal 504 increase in the direction of the vertical axis arrow that points upward in FIG. 5B. The magnitude of negative portions of the resonance cylinder pressure signal 504 increase in the direction of the vertical axis arrow that points downward in FIG. 5B. The horizontal axis represents engine position and the engine position advances from the left side of the figure to the right side of the figure.

The cylinder pressure 504 in FIG. 5B represents resonant cylinder pressure and the resonant cylinder pressure increases after combustion occurs at 550. The rising cylinder pressure excites cylinder resonance modes, thereby causing pressure in the cylinder to oscillate. The magnitude of the pressure oscillations increases as pressure in the cylinder increases. The cylinder pressure 504 shown in FIG. 5B is cylinder pressure due to resonance cylinder modes. It may be desirable to attenuate such a cylinder pressure when determining or evaluating engine control parameters and cylinder combustion parameters so that engine control parameters and combustion parameters may be determined more accurately.

The vertical axis of FIG. 5C represents cylinder pressure versus engine position, and cylinder pressure increases in the direction of the vertical axis arrow. The horizontal axis represents engine position and the engine position advances from the left side of the figure to the right side of the figure. The cylinder pressure 506 in FIG. 5C represents pressure in the cylinder and the pressure in the cylinder includes pressure due to combustion and pressure that is due to cylinder resonance modes. This combined pressure is what may be observed via a pressure sensor in a cylinder. It may be desirable to remove or attenuate cylinder resonance frequencies so that control parameters and cylinder combustion parameters may be more accurately determined.

The cylinder pressure in FIG. 5C begins by increasing on the left side of FIG. 5C where the cylinder's piston is approaching top-dead-center compression stroke. Ignition of the air-fuel mixture in the cylinder occurs at 550. The cylinder pressure increases after ignition at 550 as chemical energy is release in the form of heat from the air-fuel mixture. Further, the cylinder pressure begins to oscillate due to cylinder resonance modes.

Referring now to FIGS. 6-9, plots showing the operation of a LEAF are shown. The LEAF may operate as described in FIGS. 6-9 to filter a cylinder pressure signal to remove undesirable cylinder resonance frequencies from the cylinder pressure signal. The LEAF introduces zero phase distortion, and because it is left-sided, the filtered pressure output may be generated with little influence from resonant frequencies that may be generated after combustion is initiated in a cylinder.

Figure 6:
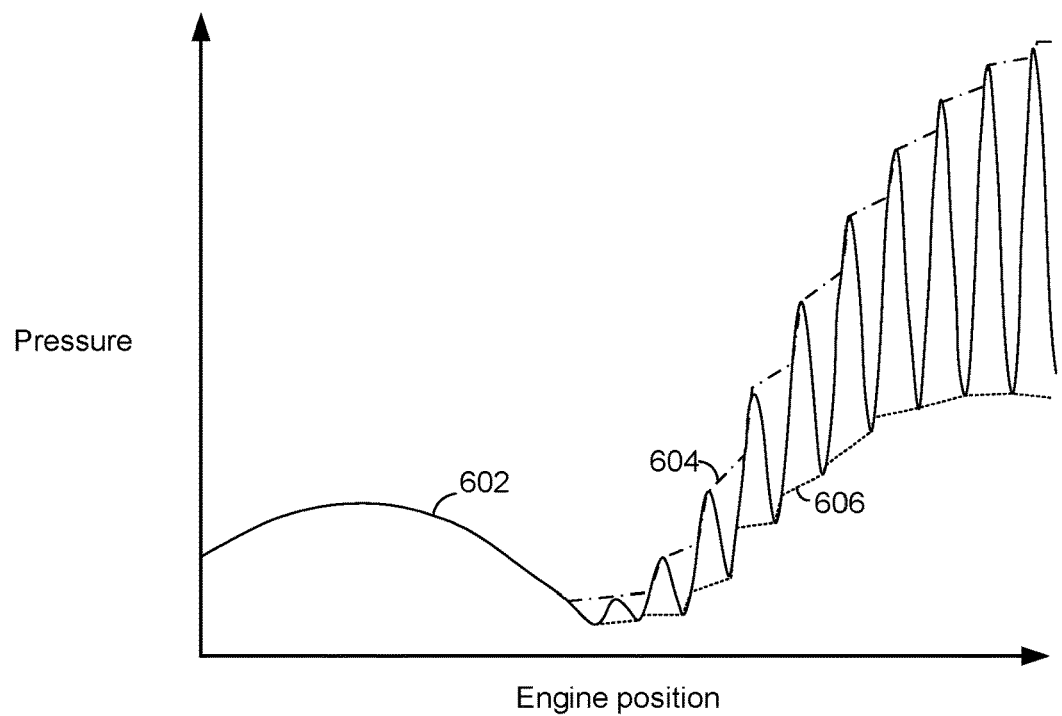
FIGS. 6-9 show features of a left-sided envelope acoustic filter.

Referring now to FIG. 6, a plot of a high envelope (e.g., data values in a first signal envelope data array) and a low envelope (e.g., data values in a second signal envelope data array) that are generated via the LEAF during the filtering process is shown. The LEAF begins by generating upper 604 and lower 606 signal envelopes that bound the raw cylinder pressure signal 602 as shown in FIG. 6. Thus, cylinder pressure values in the raw cylinder pressure signal 602 are always less than or equal to values in an upper envelope array that holds upper envelope values 604, and cylinder pressure values in the raw cylinder pressure signal 602 are always greater than or equal to values in the lower envelope array that holds values 606. Further, upper envelope values 604 are always greater than lower envelope values 606. The lower envelope values 606 are generated by discretizing raw cylinder pressure values toward a local minimum value that occurs within one time period of the characteristic frequency. The characteristic frequency is the resonant frequency that is being attenuated. In an example where the resonance frequency is 7 kHz, the time period is $1/7000$ or 143 microseconds. Thus, for each cylinder pressure sample, the local minimum that occurs within a time window of 143 microseconds is recorded as the corresponding value for the lower envelope signal. The time window is bounded on a right side by the index value and on the left side by the number of values that determine the width of the window. The same process is repeated to generate the higher envelope values 604, except that instead of applying the local minimum, a local maximum is applied.

The LEAF then processes data from the raw cylinder pressures sampled during a predetermined crankshaft angular region, starting with the earliest recorded cylinder pressure sample (e.g., the first cylinder pressure sample taken during the predetermined crankshaft angular region). At each cylinder pressure sample point (e.g., the index cylinder pressure sample), the LEAF collects a subset of cylinder pressure sample points that directly precede the index cylinder pressure sample point from the raw cylinder pressure signal, values in the lower envelope, and values in the higher envelope. The size or number of cylinder pressure sample points contained within the subset corresponds to a time period that is two or more times the characteristic time period. For example, where the resonance frequency is 7 kHz, the characteristic time period is $1/7000$ or 143 microsecond, and the time period corresponding to the duration of the subset is 2*143 microseconds, or 286 microseconds. Thus, all of the cylinder pressure sample points that occurred 286 or fewer microseconds prior to the index sample are collected into the subset. In this example, this subset includes a total 14 cylinder pressure sample points. The absolute minimum length of the subset may be two times the period of the characteristic frequency (e.g., for 7 kHz this is 286 microseconds). There is no maximum number of cylinder samples in the subset, other than the total number of cylinder pressure samples in the raw cylinder pressures sampled during a predetermined crankshaft angular region, but increasing the number of cylinder samples in the subset to four or five times the characteristic time period may not provide any benefit. This is because after five times the characteristic time period, the net improvement of the LEAF diminishes to the point of being insignificant.

Figure 7:
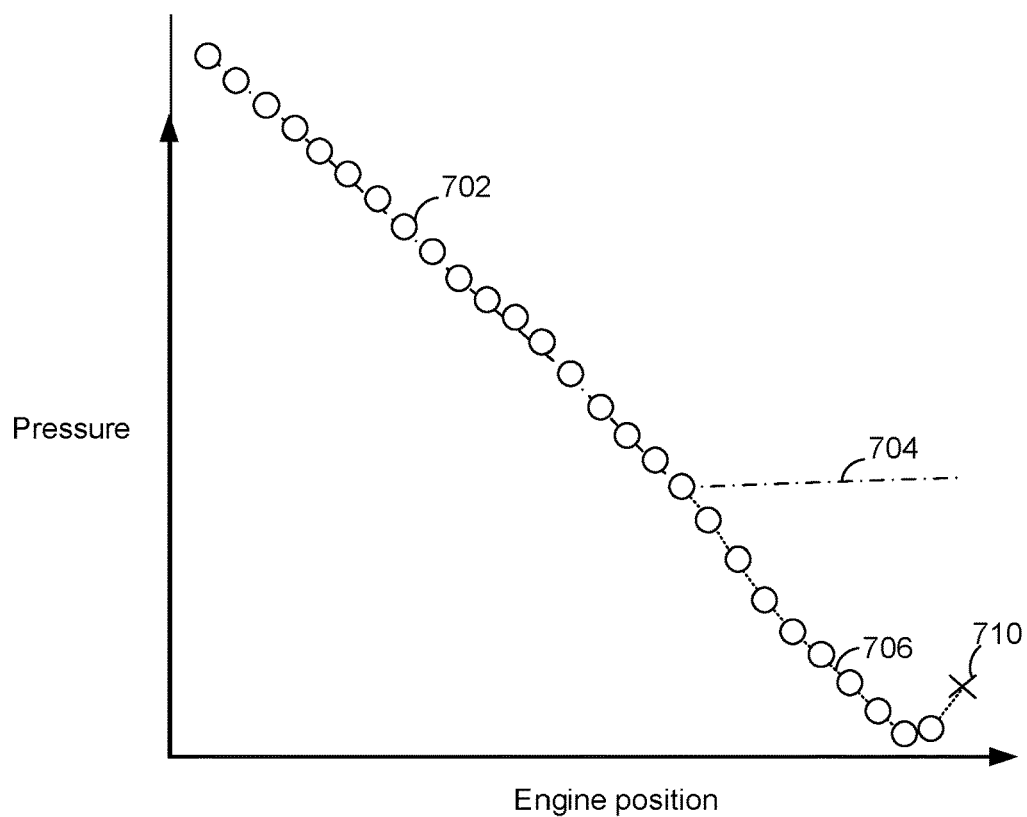

An example subset from the data shown in FIG. 6 is shown in FIG. 7. For the cylinder pressure subset shown in FIG. 7, the X 710 marks the index cylinder pressure sample and the circles 702 represent the subset of sample points. The LEAF compares the subset cylinder pressure sample points from the raw cylinder pressure to their corresponding subset sample points from the upper 704 (e.g., dash-dot line) and lower envelopes 706 (e.g., dash line). If all of the raw cylinder pressure subset samples match the values of the lower envelope 706, or if they all match the upper envelope 704, then the raw cylinder pressure sample value is retained as value in the output of the LEAF. In the FIG. 7, this is the case as all of the raw signal subset cylinder pressure sample points 702 match there corresponding sample points from the lower envelope 706. The LEAF interprets this result as an indication that the index sample is not an artifact of a resonance frequency mode, it is only a characteristic of combustion pressure. Alternatively, if the previous condition is not met and all of the raw cylinder pressure sample subset points do not match the low envelope 706, nor the upper envelope 704, then the LEAF designates the raw cylinder pressure index sample point as an artifact of the resonate frequency mode. The LEAF then records the filtered LEAF sample output for the index sample as the average of the data in the upper and lower envelopes using the same index cylinder pressure sample point from each.

Figure 8:
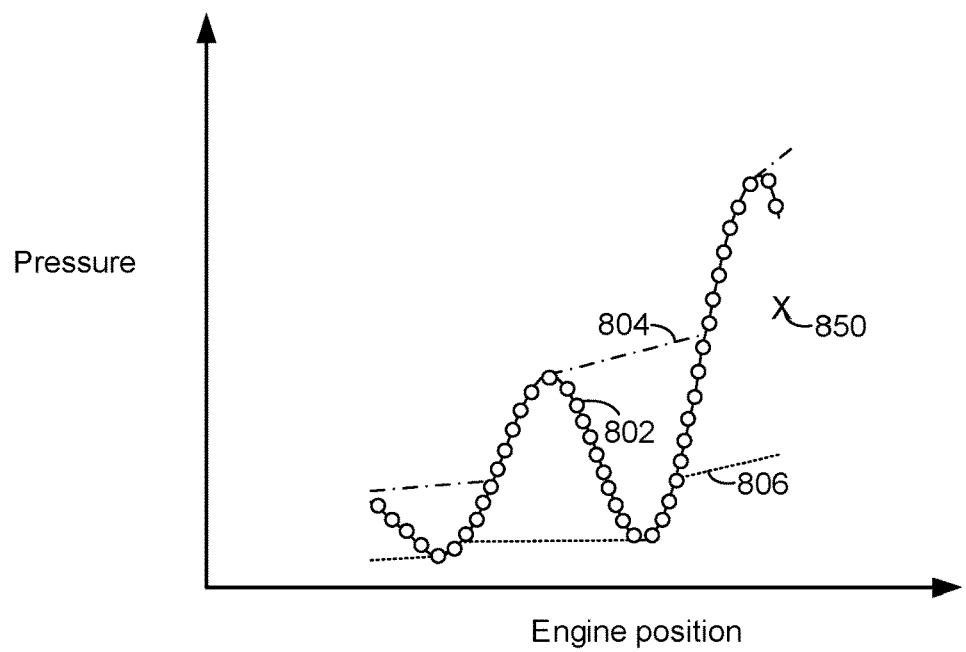

An example of this process is shown in FIG. 8, which shows an index cylinder pressure 850 and its corresponding subset of cylinder pressures indicated by circles 802. The upper envelope is indicated by the dash-dot line 804 and the lower envelope is indicated by the dashed line 806. Notice the X (index sample) representing the LEAF filtered value is half way between the upper envelope 804 and the lower envelope 806, which represents the average value of the values in the upper and lower envelopes at the same index value.

FIG. 8 shows that the raw cylinder pressure (indicated by circles 802) oscillates between the upper envelope 804 and the lower envelope 806, which is an indication of a resonance mode. The resonance mode represents a cylinder pressure oscillation around an average value. Therefore, when the LEAF detects a cylinder pressure sample that is an artifact of a resonance frequency mode, it replaces the cylinder pressure sample value with the average of the values in the upper envelope and lower envelope at the same index value since that value represents the mean pressure. The LEAF performs this analysis through the entire length of the raw cylinder pressure sampled during the predetermined crankshaft angular interval and it only replaces the cylinder pressure samples that are identified as being an artifact of a resonant mode frequency.

Figure 9:
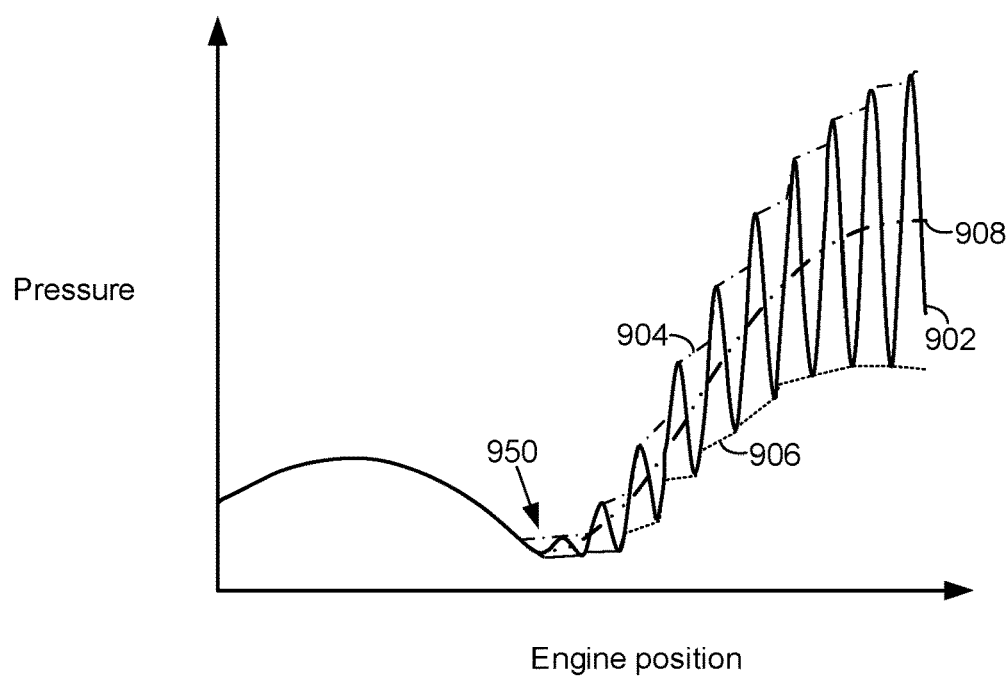
Figure 10:
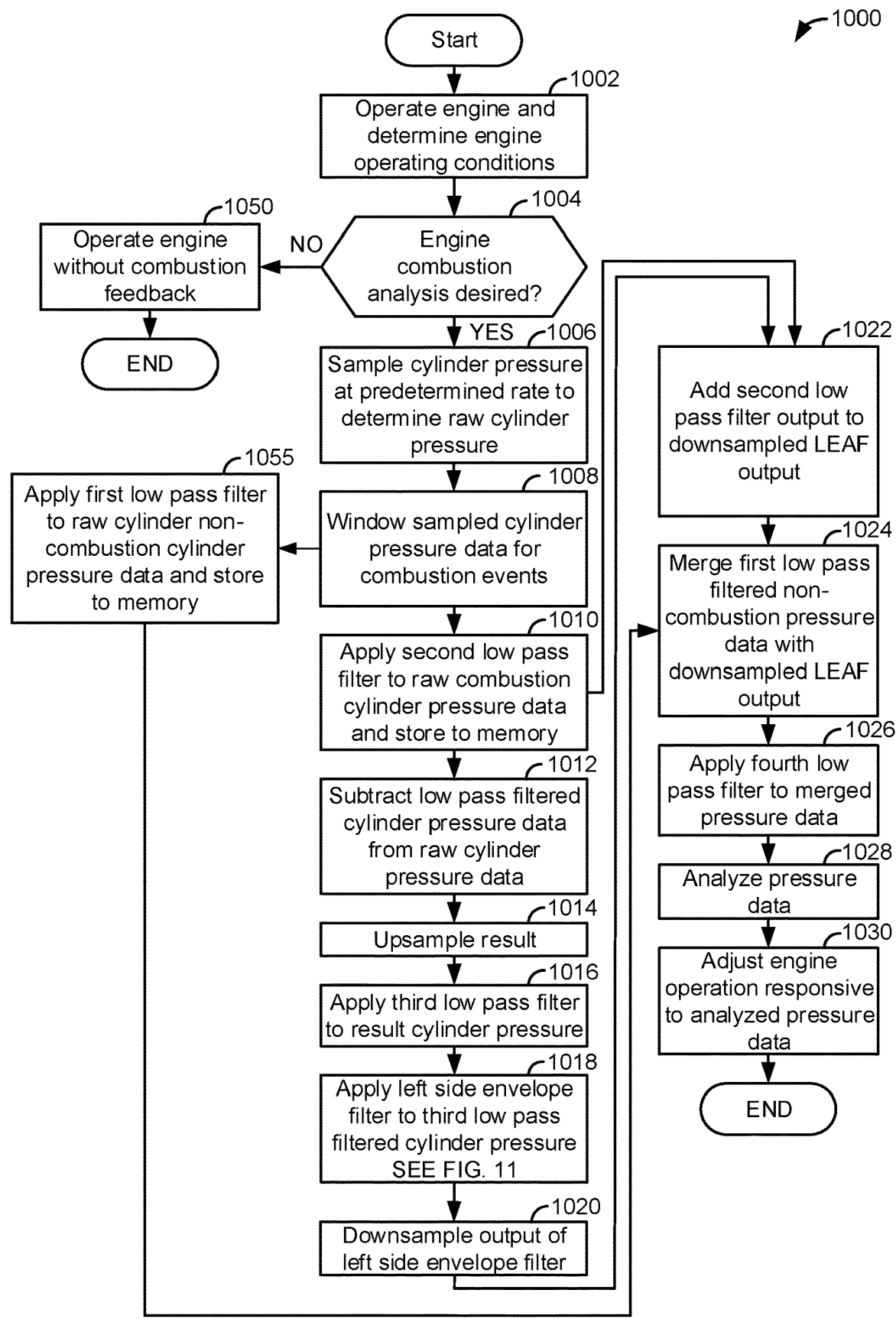
FIGS. 10-13 show an example method for filtering cylinder pressure and adjusting engine operation according to the filtered cylinder pressure.

Referring now to FIG. 9, output of the LEAF is shown along with the raw cylinder pressure, which the LEAF receives as input. The vertical axis represents cylinder pressure and cylinder pressure increases in the direction of the vertical axis arrow. The horizontal axis represents engine position and the engine position advances (e.g., moves from −15 crankshaft degrees before TDC compression stroke to −5 crankshaft degrees before TDC compression stroke) in the direction of the horizontal axis arrow.

The raw cylinder pressure samples are indicated by solid line 902. Output of the LEAF is indicated by dash-dot-dot line 908. The upper cylinder pressure envelope is indicated by dash-dot line 904. The lower cylinder pressure envelope is indicated by dashed line 906. The output of the LEAF and the upper and lower envelopes are equal to the raw cylinder pressure when only the raw cylinder pressure trace 902 is visible.

The sequence begins on the left side of the plot and it moves to the right side of the plot. The raw cylinder pressure is rising on the left side of the plot and then it falls a bit before ignition is initiated at 950. The ignition increases pressure in the cylinder, thereby exciting resonance modes of the cylinder, which cause the raw cylinder pressure to begin to oscillate to the right of 950. The LEAF begins to output the average of the upper envelope value 904 and lower envelope value 906 shortly after 950. Thus, output of the LEAF is close to the cylinder pressure indicated in FIG. 5A. Output of the LEAF may then be analyzed to determine control parameters and cylinder combustion parameters for adjusting engine operation to improve engine performance and/or emissions.

Referring now to FIGS. 10-13, a flowchart of a method for filtering cylinder pressure and operating an engine based on the filtered cylinder pressure is shown. The method of FIGS. 10-13 may be incorporated into and may cooperate with the system of FIGS. 1-3. Further, at least portions of the method of FIGS. 10-13 may be incorporated as executable instructions stored in non-transitory memory while other portions of the method may be performed via a controller transforming operating states of devices and actuators in the physical world. The method of FIGS. 10-13 may be repeatedly executed for each engine cylinder that includes a cylinder pressure sensor.

At 1002, method 1000 operates the engine (e.g., rotates the engine and combusts air and fuel within the engine) and determines engine operating conditions. Engine operating conditions may include, but are not limited to cylinder pressures, engine speed, engine load, engine temperature, barometric pressure, and ambient air temperature. Method 1000 proceeds to 1004.

At 1004, method 1000 judges whether or not engine combustion analysis and control is requested or desired. Engine combustion analysis and control may be requested during engine starting, engine running, and during engine stopping. Engine combustion analysis may be requested via the controller in response to engine and vehicle operating conditions. If engine combustion analysis and control is requested or desired, the answer is yes and method 1000 proceeds to 1006. Otherwise, method 1000 proceeds to 1050.

At 1050, method 1000 operates the engine (e.g., rotates the engine and combusts air and fuel within engine cylinders) without performing combustion analysis and without combustion feedback. Method 1000 proceeds to exit.

At 1006, method 1000 samples cylinder pressure in a cylinder via controller 12. Sampling the cylinder pressure may include sensing cylinder pressure via a pressure sensor and digitizing output of the cylinder pressure sensor and storing discrete cylinder pressure values to controller random access memory. The discrete cylinder pressure values stored in controller memory may be referred to as raw or unfiltered cylinder pressure. The output of the cylinder pressure sensor may be sampled at a predetermined rate (e.g., 100 kilohertz), the sample frequency Fsample. Method 1000 proceeds to 1008.

At 1008, method 1000 applies a windowing technique to sort the sampled cylinder pressure data values that are stored in controller memory into cylinder combustion pressures and cylinder non-combustion pressures. For example, cylinders pressures that were sampled between a predetermined crankshaft angular range (e.g., 140 crankshaft degrees before top-dead-center compression stroke and 180 crankshaft degrees after top-dead-center compression stroke of a cylinder cycle) may be classified as raw cylinder combustion pressures. The other cylinder pressures of the cylinder cycle that were sampled outside of the predetermined crankshaft angular range may be classified as raw cylinder non-combustion pressures. The cylinder pressures that were sampled in the predetermined crankshaft angular range may be referred to as raw cylinder combustion pressure signal data. Method 100 proceeds to 1010 and 1055 after sorting the sampled cylinder pressure data values for a cylinder cycle.

At 1055, method 1000 applies a first low pass filter to the raw cylinder non-combustion pressures. The first low pass filter may be a digital low pass filter having a 7 kilohertz cut-off frequency. The raw cylinder non-combustion pressures are input to the first low pass filter and the first low pass filter's output is supplied to 1024. The output values of the first digital low pass filter may be stored in a first low pass filter output array in controller random access memory.

At 1010, method 1000 applies a second low pass filter to the raw cylinder combustion pressures. The second low pass filter may be a digital low pass filter having a 2 kilohertz cut-off frequency. The raw cylinder combustion pressures are input to the second low pass filter and the second low pass filter's output is supplied to 1012 and 1022. Output of the second low pass filter may be stored in random access memory of the controller in a second low pass filter output array. Method 1000 proceeds to 1012.

At 1012, method 1000 subtracts the output of the second low pass filter from the raw cylinder combustion pressures. This effectively high pass filters the raw cylinder combustion pressures to create high pass filtered cylinder combustion pressures, which are stored to an array in controller random access memory. Method 1000 proceeds to 1014.

At 1014, method 1000 upsamples the high pass filtered cylinder combustion pressures. In one example, the high pass filtered cylinder combustion pressures are upsampled 20 times. Upsampling 20 times converts a single high pass filtered cylinder combustion pressure sample into 20 high pass filtered cylinder combustion pressures having a same value as the single high pass filtered cylinder combustion pressure sample. In one example, the array of high pass filtered cylinder combustion pressures is increased in size by 20 times when upsampled 20 times. The upsampling allows the LEAF to attenuate additional frequencies and improve LEAF output. The upsampled frequency (uFsample) is the sample frequency Fsample multiplied by the upsample rate (e.g., 20). The upsampled cylinder combustion pressures are stored in an array in controller random access memory. Method 1000 proceeds to 1016.

At 1016, method 1000 applies a third low pass filter to the upsampled cylinder combustion pressures that are stored in the upsampled cylinder combustion pressure array. The third low pass filter may be a digital low pass filter having a 50 kilohertz cut-off frequency. The upsampled cylinder combustion pressures are input to the third low pass filter and the third low pass filter's output is supplied to 1018. Output values of the third low pass filter may be referred to as filtered upsampled cylinder combustion pressure and these values may be stored in a filtered upsampled cylinder combustion pressure array. Method 1000 proceeds to 1018.

Figure 11:
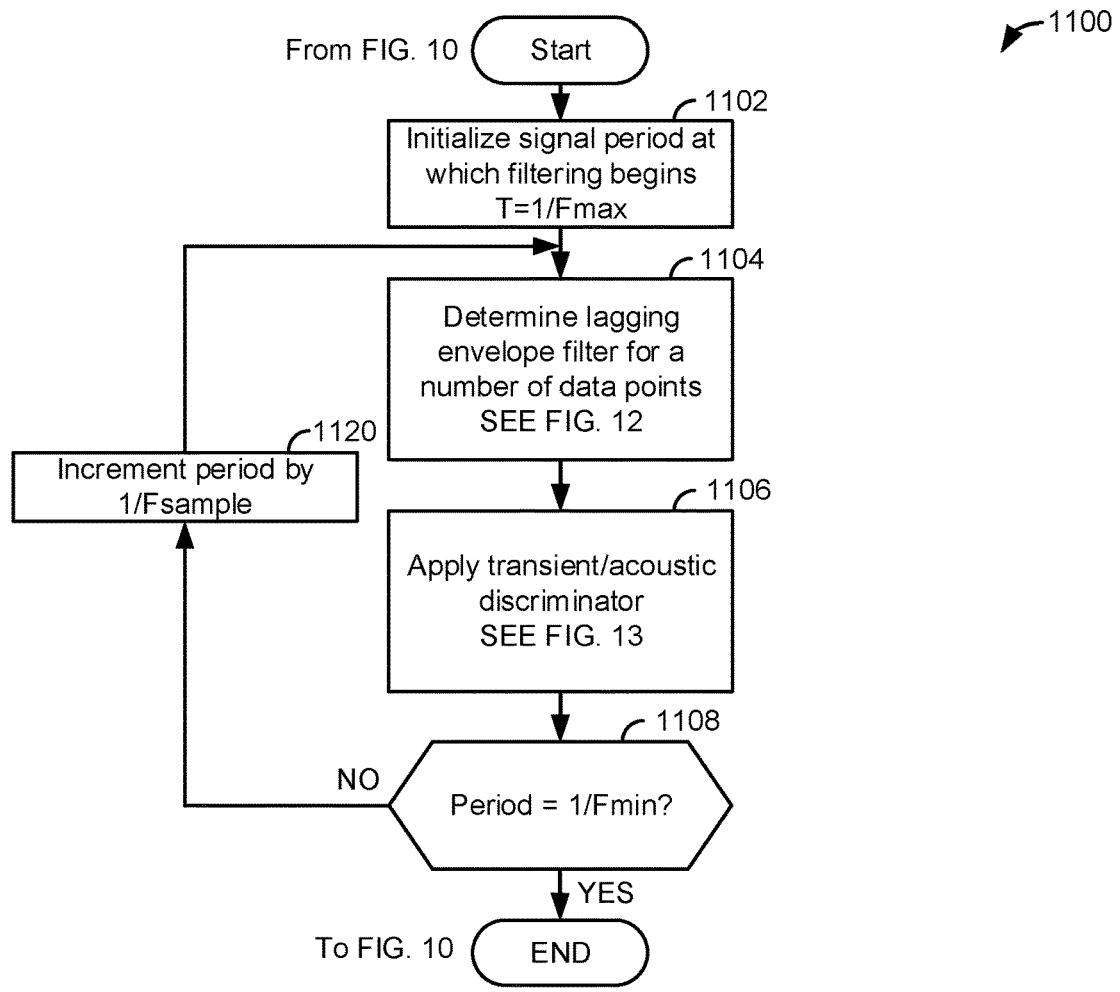
Figure 12:
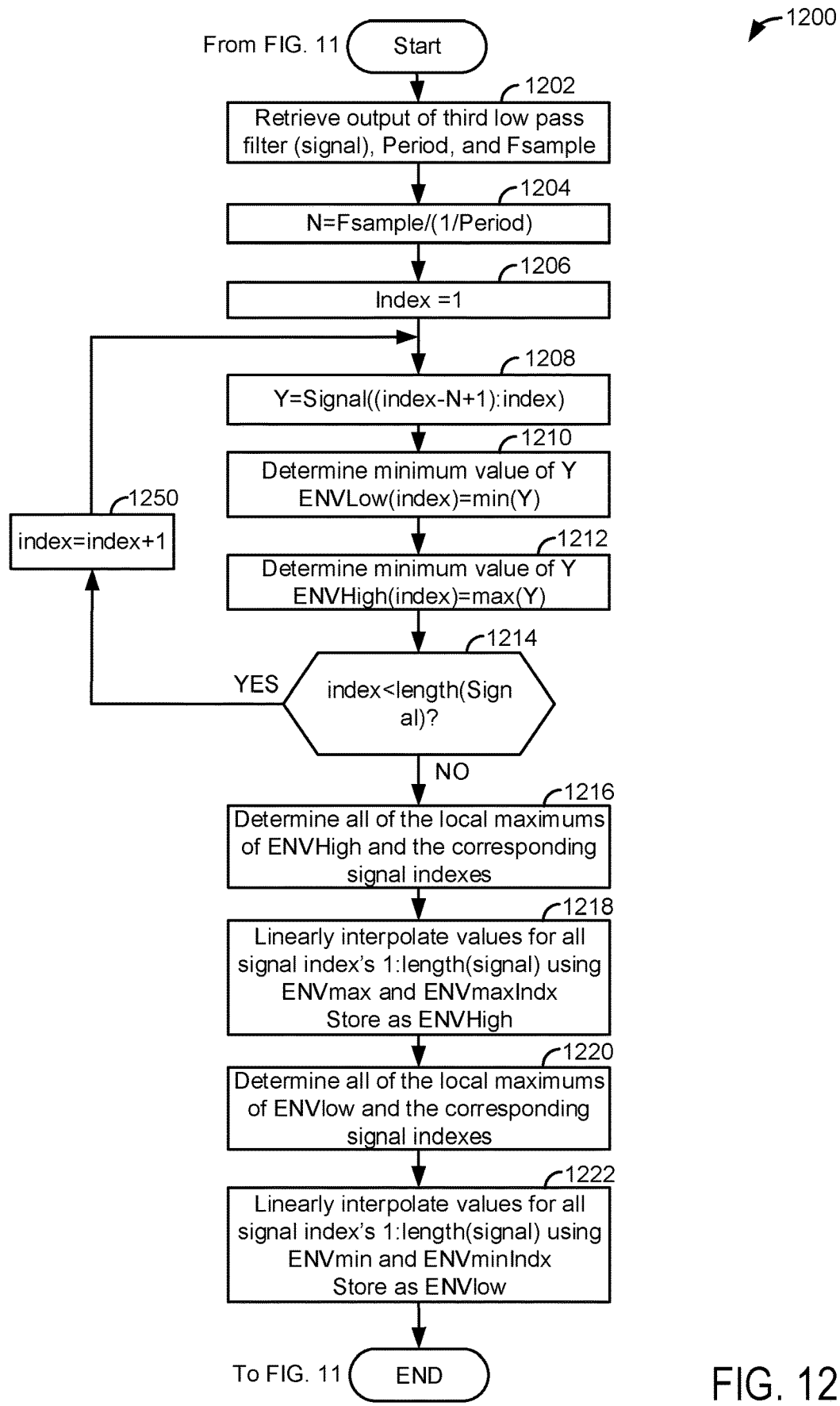
Figure 13:
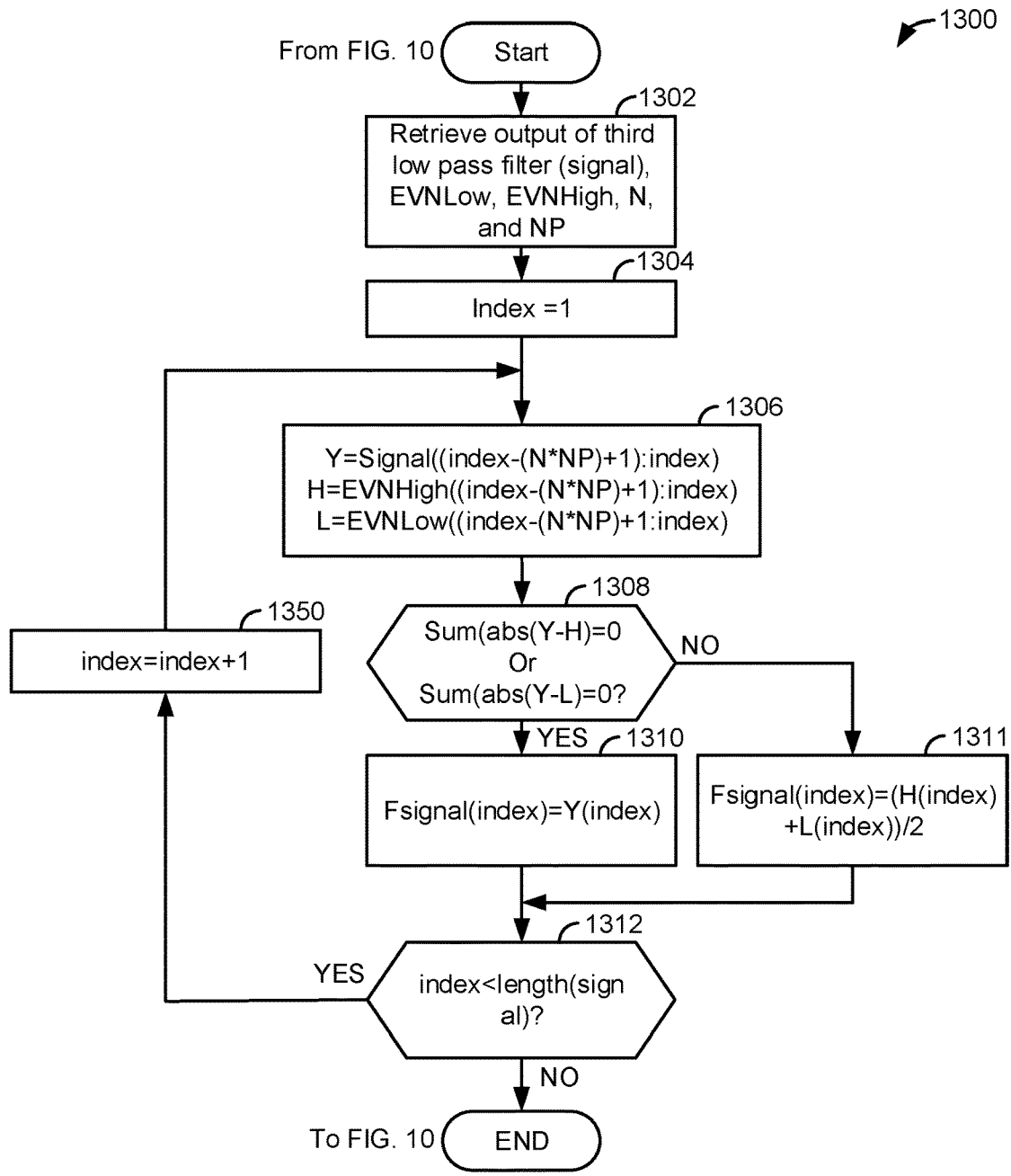

At 1018, method 1000 applies the LEAF described in FIGS. 11-13 to the values stored in the filtered upsampled cylinder combustion pressure array. Method 1000 proceeds to 1020.

At 1020, method 1000 downsamples the values output from the LEAF. In one example, the LEAF output values are downsampled 20 times. Downsampling 20 times converts twenty LEAF output values into a single LEAF output value. In one example, the downsampling is performed via determining an average of 20 LEAF output values and storing the average value as one LEAF output cylinder value. The downsampled LEAF output values may be stored in controller random access memory in a downsampled LEAF output array. Method 1000 proceeds to 1022.

At 1022, method 1000 adds output of the second low pass filter at 1010 to the downsampled LEAF output. The values in the downsampled LEAF output array are added to the values in the second low pass filter output array to generate a filtered combustion pressure array. The length of the filtered combustion pressure array and the lengths of the downsampled LEAF output array and the second low pass filter output array are all the same or equal. Thus, a value in a first row and first column in the downsampled LEAF output array is added to a value that is in a first row and first column in the second low pass filter output array. The resulting value is stored as a value in the first row and first column in the filtered combustion pressure array. Method 1000 proceeds to 1024.

At 1024, method 1000 merges the values in the first low pass filter output array with values in the filtered combustion pressure array to generate a cylinder pressure array for an entire cylinder cycle (e.g., two engine revolutions for a four stroke engine). In particular, the cylinder pressure array for the entire cylinder cycle includes non-combustion cylinder pressures and combustion cylinder pressures. Method 1000 proceeds to 1026.

At 1026, method 1000 applies a fourth low pass filter to the values in the cylinder pressure array for an entire cylinder cycle. The fourth low pass filter may be a digital low pass filter having an 18 kilohertz cut-off frequency. The values in the cylinder pressure array for an entire cylinder cycle are input to the fourth low pass filter and the fourth low pass filter's output is supplied to 1024 as values in an array of final filtered cylinder pressures.

At 1028, the values in the array of final filtered cylinder pressures are processed to determine engine control parameters and engine combustion parameters. For example, method 1000 may determine location of ignition for a cylinder cycle (e.g., a crankshaft angle where ignition begins during the cylinder cycle), location of peak cylinder pressure for a cylinder cycle, crankshaft angle where a predetermined mass fraction of the cylinder charge is combusted, rate of heat release in the cylinder, and other known engine control and combustion parameters. Method 1000 proceeds to 1030.

At 1030, method 1000 adjusts fuel injection timing, EGR amount supplied to the engine, spark timing for spark ignition engines, and cylinder air charge amount responsive to the engine control parameters and combustion parameters that were determined at 1028. For example, if it is determined that ignition occurred at 10 crankshaft degrees before top-dead-center compression stroke and the requested or desired ignition timing is 12 crankshaft degrees before top-dead-center compression stroke, then method 1000 may advance fuel injection timing via the fuel injector so that ignition timing may be advanced. Further, if it is determined that a rate heat release is greater than is desired, additional EGR may be delivered to the engine via further opening the EGR valve. In another example, if peak cylinder pressure is greater than is desired, boost pressure may be lowered via a turbocharger wastegate or vane control, poppet valve timing adjustments, and/or fuel injection timing adjustments may be made to lower the peak cylinder pressure. Method 1000 proceeds to exit.

Referring now to FIG. 11, a method for applying a LEAF is shown. At 1102, method 1100 initializes a signal period (e.g., the variable Period) for processing the values in the filtered upsampled cylinder combustion pressure array via the LEAF. In one example, the signal period is the period of the maximum frequency period of the upsampled cylinder combustion pressure. For example, if cylinder pressure was upsampled to 2000 kilohertz, then the signal period is determined as $\frac{1}{2000}$ Kilohertz=$500*10^{-9}$ seconds. Method 1100 begins by processing the highest frequencies first so that the frequencies requested to be attenuated (e.g., acoustic cylinder resonance frequencies) may be attenuated without attenuating other frequencies. Method 1100 proceeds to 1104.

At 1104, method 1100 determines lagging envelopes for the values in the filtered upsampled cylinder combustion pressure array. The lagging envelopes are determined as is described in FIG. 12. Method 1100 proceeds to 1106.

At 1106, method 1100 applies a transient acoustic discriminator to filter values in the filtered cylinder combustion pressure array. The acoustic discriminator is applied as is described in FIG. 13. Method 1100 proceeds to 1108.

At 1108, method 1100 judges if the value of the period is equal to 1/Fmin, where Fmin is the lowest frequency that is to be attenuated in the filtered upsampled cylinder combustion pressure array. For example, if the lowest acoustic noise to be attenuated is 7 kilohertz, then method 1100 judges if the value of the period is equal to 143 microseconds. If the value of the period is equal to Fmin, then the answer is yes and method 1100 proceeds to return to the method of FIG. 10. Otherwise, the answer is no and method 1100 proceeds to 1120 where the value of the period is increased by 1/Fsample or the reciprocal of the upsampled frequency (e.g., 1/(100 kilohertz*20). Method 1100 proceeds to 1104.

Referring now to FIG. 12, a method for generating data values that form an upper cylinder pressure envelope and data values that form a lower cylinder pressure envelope is shown. At 1202, method 1200 retrieves the output of the third low pass filter (e.g., values in the filtered upsampled cylinder combustion pressure array, which may have a designation as Signal), the value of Period (e.g., the time interval for the frequency being attenuated during execution of the loop) value from FIG. 11, and the cylinder pressure upsample frequency (uFsample) as described in FIG. 10. Method 1200 proceeds to 1204.

At 1204, method 12 determines a value N, which is an actual total number of cylinder pressure samples in the time period (Period). The value of N may be determined via the following equation: N=uFsample/(1/Period). Method 1200 proceeds to 1206 after determining the value of N.

At 1206, method 1200 initializes an index value that is used to progress though the filtered upsampled cylinder combustion pressure array (Signal). The index is initialized to a value of one. Method 1200 proceeds to 1208.

At 1208, method 1200 determines an array Y of subset of filtered upsampled cylinder combustion pressures. In particular, the array Y is determined as Y=Signal(index-N+1): index), which copies elements index-N+1 to index into the array Y. For example, if index=30 and N=10, then data from cell or entry 21 to cell or entry 30 of the Signal array is copied to an makes up array Y. Thus, the array Y is built by removing a subset of values from the Signal array that holds the filtered upsampled cylinder combustion pressure data. Method 1200 proceeds to 1210.

At 1210, method 1200 generates a portion of a lower envelope that bounds the filtered upsampled cylinder combustion pressure data via finding the minimum value in the present subset of data Y. The portion of the lower envelope is generated via the instruction ENVLow(index)=min(Y), which stores the minimum value in array Y in the array ENVLow at location index. The array ENVLow is filled as the value of index is incremented. Method 1200 proceeds to 1212.

At 1212, method 1200 generates a portion of a upper envelope that bounds the filtered upsampled cylinder combustion pressure data via finding the maximum value in the present subset of data Y. The portion of the upper envelope is generated via the instruction ENVHigh(index)=min(Y), which stores the maximum value in array Y in the array ENVHigh at location index. The array ENVHigh is filled as the value of index is incremented. Method 1200 proceeds to 1214.

At 1214, method 1200 judges if the present value of the variable index is less than the length or the actual total number of elements stored in the Signal array. If so, the answer is yes and method 1200 proceeds to 1250. Otherwise, the answer is no and method 1200 proceeds to 1216.

At 1250, the value of the variable index is incremented by one. Method 1200 returns back to 1208.

At 1216, method 1200 determines all of the local maximums of the array ENVHigh and the corresponding signal indexes. The local maximum is the last index (index) within the specified time window where the derivative of pressure (dP/dt) is positive and then becomes negative at index+1. So, depending on the size of the time window, there may be multiple maximum values within a cylinder pressure signal, which may be referred to as local maximums. Method 1200 proceeds to 1218.

At 1218, method 1200 linearly interpolates values for all index values from 1:length(Signal) (e.g., the length of the Signal array or the number of elements in the Signal array) using ENVmax and ENVmaxIndx (e.g., a secondary index value) and stores as the interpolated value in the array ENVHigh. Method 1200 proceeds to 1220.

At 1220, method 1200 determines all of the local maximums of the array ENVLow and the corresponding signal indexes. The local minimum is the last index (index) within the specified time window where the derivative of pressure (dP/dt) is negative and then becomes positive at index+1. So, depending on the size of the time window, there may be multiple minimum values within a cylinder pressure signal, which may be referred to as local minimums. Method 1200 proceeds to 1222.

At 1222, method 1200 linearly interpolates values for all index values from 1:length(Signal) using ENVmin and ENVminIndx and store as ENVHigh. For example, Method 1200 proceeds to exit.

Referring now to FIG. 13, a method for filtering cylinder pressure data in the filtered upsampled cylinder combustion pressure array (Signal) is shown. At 1302, method 1300 retrieves the output of the third low pass filter (e.g., values in the filtered upsampled cylinder combustion pressure array, which may have a designation as Signal), the value of N (e.g., the number of cylinder pressure samples in the Period) value from FIG. 12, NP an empirically determined value that defines the number of periods, the lower cylinder pressure envelope EVNLow, and the upper cylinder pressure envelope EVNHigh. Method 1300 proceeds to 1304.

At 1304, method 1300 initializes an index value that is used to progress though the filtered upsampled cylinder combustion pressure array (Signal). The index is initialized to a value of one. Method 1300 proceeds to 1206.

At 1306, method 1300 determines values of three variables Y, H, and L. The value of Y is Y=Signal((index−(N*NP)+1):index). Thus, Y is an array beginning at cell or entry index−(N*NP)+1 and ending at the cell or entry index. The values of array Y are copied from the Signal array or the filtered upsampled cylinder combustion pressure array.

The value of H is H=EVNHigh((index−(N*NP)+1):index). Thus, H is an array beginning at cell or entry index−(N*NP)+1 and ending at the cell or entry index. The values of array H are copied from the EVNHigh array or the upper cylinder pressure envelope.

The value of L is L=ENVLow((index−(N*NP)+1):index). Thus, L is an array beginning at cell or entry index−(N*NP)+1 and ending at the cell or entry index. The values of array L are copied from the ENVLow array or the lower cylinder pressure envelope. Method 1300 proceeds to 1308 after the values in arrays Y, H, and L have been determined.

At 1308, method 1300 judges if the sum of the absolute value of (Y−H) is zero or if the sum of the absolute value of (Y−L) is zero. If so, the answer is yes and method 1300 proceeds to 1310. Otherwise, the answer is no and method 1300 proceeds to 1311. If (Y−H) is zero or if (Y−L) is zero, then the cylinder pressure is on or equal to the cylinder pressure value in the lower cylinder pressure envelope or the upper cylinder pressure envelope, which indicates that the cylinder pressure at the present index is only combustion pressure. Therefore, the combustion pressure will be retained in the final filtered LEAF output. However, if (Y−H) is not zero and if (Y−L) is not zero, then the cylinder pressure is not on or equal to the cylinder pressure value in the lower cylinder pressure envelope or the upper cylinder pressure envelope, which indicates that the cylinder pressure at the present index is acoustic pressure related to the cylinder's natural frequency. Therefore, the combustion pressure value will be replaced by an average of the value of the upper cylinder pressure envelope at the location of the index and the value of the lower cylinder pressure envelope at the location of the index. If (Y−H) is zero or if (Y−L) is zero, then the answer is yes and method 1300 proceeds to 1310. Otherwise, method 1300 proceeds to 1311.

At 1310, method 1300 stores that present value in the array Y at the location reference of index in a LEAF output array Fsignal at a location reference location index. Method 1300 proceeds to 1312.

At 1312, method 1300 adds the value of array H at the location reference index with the value of array L at the location reference index, and then divides the result by two and stores the division result in the LEAF output array Fsignal at a location reference location index. Alternatively, method 1300 may store a percentage of the sum of the value from the H array added to the value from the L array (e.g., Fsignal=(H(index)+L(index))*0.02). Method 1300 proceeds to 1314.

At 1312, method 1300 judges if the present value of the variable index is less than the length or the actual total number of elements stored in the Signal array. If so, the answer is yes and method 1300 proceeds to 1350. Otherwise, the answer is no and method 1300 proceeds to exit.

At 1350, the value of the variable index is incremented by one. Method 1300 returns back to 1306.

In this way, the method of FIGS. 10-13 generates upper and lower cylinder pressure envelopes and then generates filtered cylinder pressure values that are an average of the upper and lower cylinder pressure envelopes or filtered upsampled cylinder combustion pressure. The process described in FIGS. 10-13 may remove unwanted acoustic pressures from combustion pressures that develop in a cylinder so that determination of combustion parameters and engine control parameters may be improved. The variable "index" is a real number that may reference one or more arrays described herein.

Thus, the method of FIGS. 10-13 provides for an engine operating method, comprising: storing values of a sampled cylinder pressure in a data array in memory of a controller; generating a first signal envelope data array and a second signal envelope data array from the values of the sampled cylinder pressure in the data array, values in the first signal envelope data array and values in the second signal envelope data array bounding the values in the data array; generating values in a filtered cylinder pressure data array that are less than or equal to values in the first signal envelope data array and values that are equal to or greater than values in the second signal envelope data array; and adjusting an engine actuator via the controller responsive to the values in the filtered cylinder pressure data array. The engine method includes where the engine actuator is a fuel injector. The engine method includes where the engine actuator is an exhaust gas recirculation valve. The engine method includes where the engine actuator is a turbocharger waste gate. The engine method includes where the engine actuator is a turbocharger vane control actuator. The engine method includes where the values in the first signal envelope data array are greater than the values in the second signal envelope data array. The engine method includes where the values in the first signal envelope data array are based on a value in a group of the values of the sampled cylinder pressure being greater than all other values in the group of values of the sampled cylinder pressure. The engine method includes where the values in the second signal envelope data array are based on a value in a group of the values of the sampled cylinder pressure being less than all other values in the group of values of the sampled cylinder pressure.

The method of FIGS. 10-13 provides for an engine operating method, comprising: storing values of a sampled cylinder pressure in a data array in memory of a controller; generating values in a filtered cylinder pressure data array based on the stored values, the filtered cylinder pressure data array including values that are an average of values in a first signal envelope data array and values in in a second signal envelope data array; and adjusting an engine actuator via the controller responsive to the values in the filtered cylinder pressure data array. The engine method includes where the filtered cylinder pressure data array also includes values that are not the average of values in the first signal envelope data array and values in the second signal envelope data array. The engine method further comprises filtering the stored values via a low pass filter. The engine method further comprises upsampling output of the low pass filter to generate an upsampled cylinder pressure data array. The engine method further comprises generating the first signal envelope data array via selecting maximum values in groups of data in the upsampled cylinder pressure data array. The engine method further comprises generating the second signal envelope data array via selecting minimum values in groups of data in the upsampled cylinder pressure data array. The engine includes where the engine actuator is an exhaust gas recirculation valve.

In another representation, the method of FIGS. 10-13 provides for an engine operating method, comprising: storing values of a sampled cylinder pressure in a data array in memory of a controller; separating combustion cylinder pressures from non-combustion cylinder pressures from data in the data array, generating values in a filtered cylinder pressure data array based on the combustion cylinder pressures, the filtered cylinder pressure data array including values that are an average of values in a first signal envelope data array and values in in a second signal envelope data array; and adjusting an engine actuator via the controller responsive to the values in the filtered cylinder pressure data array. The engine method includes where the combustion cylinder pressures are identified via engine crankshaft angle.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. Further, portions of the methods may be physical actions taken in the real world to change a state of a device. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example examples described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller. One or more of the method steps described herein may be omitted if desired.

It will be appreciated that the configurations and routines disclosed herein are exemplary in nature, and that these specific examples are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An engine operating method, comprising:
   storing values of a sampled cylinder pressure in a data array in memory of a controller;
   filtering the sampled cylinder pressure to provide filtered sampled cylinder pressure;
   upsampling the filtered sampled cylinder pressure to provide upsampled filtered cylinder pressure;
   generating a first signal envelope data array and a second signal envelope data array from the values of the unsampled filtered cylinder pressure, values in the first signal envelope data array and values in the second signal envelope data array bounding the values in the data array;
   generating values in a filtered cylinder pressure data array that are less than or equal to values in the first signal envelope data array and values that are equal to or greater than values in the second signal envelope data array; and
   adjusting an engine actuator via the controller responsive to the values in the filtered cylinder pressure data array.

2. The engine method of claim 1, where the engine actuator is a fuel injector.

3. The engine method of claim 1, where the engine actuator is an exhaust gas recirculation valve.

4. The engine method of claim 1, where the engine actuator is a turbocharger waste gate.

5. The engine method of claim 1, where the engine actuator is a turbocharger vane control actuator.

6. The engine method of claim 1, where the values in the first signal envelope data array are greater than the values in the second signal envelope data array.

7. The engine method of claim 6, where the values in the first signal envelope data array are based on a value in a group of the values of the sampled cylinder pressure being greater than all other values in the group of values of the sampled cylinder pressure.

8. The engine method of claim 6, where the values in the second signal envelope data array are based on a value in a group of the values of the sampled cylinder pressure being less than all other values in the group of values of the sampled cylinder pressure.

9. An engine operating method, comprising:
   storing values of a sampled cylinder pressure in a data array in memory of a controller;
   generating values in a filtered cylinder pressure data array based on the stored values, the filtered cylinder pressure data array including values that are an average of values in a first signal envelope data array and values in in a second signal envelope data array; and
   adjusting an engine actuator via the controller responsive to the values in the filtered cylinder pressure data array.

10. The engine method of claim 9, where the filtered cylinder pressure data array also includes values that are not the average of values in the first signal envelope data array and values in the second signal envelope data array.

11. The engine method of claim 9, further comprising filtering the stored values via a low pass filter.

12. The engine method of claim 11, further comprising upsampling output of the low pass filter to generate an upsampled cylinder pressure data array.

13. The engine method of claim 12, further comprising generating the first signal envelope data array via selecting maximum values in groups of data in the upsampled cylinder pressure data array.

14. The engine method of claim 12, further comprising generating the second signal envelope data array via selecting minimum values in groups of data in the upsampled cylinder pressure data array.

15. The engine method of claim 9, where the engine actuator is an exhaust gas recirculation valve.

16. An engine system, comprising:
    an internal combustion engine including a cylinder with a pressure sensor; and
    a controller including executable instructions stored in non-transitory memory to generate values in a filtered cylinder pressure data array based on stored cylinder pressure values, the filtered cylinder pressure data array including values that are an average of values in a first signal envelope data array and values in in a second signal envelope data array, and to adjust an engine actuator responsive to the values in the filtered cylinder pressure data array.

17. The engine system of claim 16, further comprising a fuel injector, and additional executable instructions stored in non-transitory memory to adjust fuel injector timing in response to values in the filtered cylinder pressure data array.

18. The engine system of claim 16, further comprising additional executable instructions stored in non-transitory memory to generate the first signal envelope data array.

19. The engine system of claim 18, further comprising additional executable instructions stored in non-transitory memory to generate the second signal envelope data array.

20. The engine system of claim 16, further comprising additional executable instructions stored in non-transitory memory to generate the values in the filtered cylinder pressure data array from values in the first signal envelope data array and values in the second signal envelope data array.

* * * * *